United States Patent

Amrehn

[15] 3,636,331
[45] Jan. 18, 1972

[54] METHOD AND SYSTEM FOR THE AUTOMATIC CONTROL OF CHEMICAL PLANTS WITH PARALLEL-CONNECTED COMPUTER BACKUP SYSTEM

[72] Inventor: Hermann Amrehn, Marl, Germany
[73] Assignee: Chemische Werke Huls Aktiengesellschaft, Marl, Germany
[22] Filed: June 14, 1968
[21] Appl. No.: 737,171

[30] Foreign Application Priority Data
June 16, 1967 Germany..............................C 42634

[52] U.S. Cl....................235/151.12, 235/151.1, 340/172.5, 235/153
[51] Int. Cl. ......................................................G06b 15/46
[58] Field of Search......................235/151.1, 151.12, 150.5; 340/172.5, 146.1

[56] References Cited

UNITED STATES PATENTS

| | | | |
|---|---|---|---|
| 2,932,005 | 4/1960 | Brightman | 340/146.1 |
| 3,060,273 | 10/1962 | Nowak et al. | 340/146.1 UX |
| 3,324,458 | 6/1967 | MacArthur | 235/151.1 X |
| 3,330,943 | 7/1967 | Hawkins | 235/150.5 |
| 3,377,623 | 4/1968 | Reut et al. | 340/146.1 UX |
| 3,409,877 | 11/1968 | Alterman et al. | 340/146.1 UX |

*Primary Examiner*—Joseph F. Ruggiero
*Attorney*—Craig, Antonelli and Hill

[57] ABSTRACT

A method and system for the automatic control and regulation of chemical processes in chemical plants using digital process computers which comprises operating at least two identical computers in parallel, each equipped with an operating core storage means (principal memory means) and a mass storage means (secondary memory means), the computers being connected in parallel to each other and connected with a chemical plant by means of a data flow bus wherein one computer, designated as the control computer, actively controls and regulates the chemical process whereas the other computer, designated as the backup computer, follows the progression of the chemical process by a transmittal of the data from the control computer, and continues the chemical process without interruption when the control computer becomes inoperative.

25 Claims, 4 Drawing Figures

METHOD AND SYSTEM FOR THE AUTOMATIC CONTROL OF CHEMICAL PLANTS WITH PARALLEL-CONNECTED COMPUTER BACKUP SYSTEM

BACKGROUND OF THE INVENTION

This invention relates to process control systems of chemical processes and particularly to a computerized process control system having a full digital backup facility. The terminology used in this application is based on the "Handbook of Automation, Computation and Control," vol. 2, Computers and Data-Processing, chapter I, John Wiley & Sons Inc., Los Angeles, Calif., 1959.

In chemical process technology, there has been always the desire to develop automatic process control systems. Initially, as many process variables as possible were maintained at desired predetermined values (setpoints) by means of control devices. In most applications the control circuits (closed loops) were independent of one another and were not, if at all possible, supposed to influence one another. Consequently the result of the process, that is the final chemical product with respect to quality or cost, could not be analyzed readily and thus it was difficult to optimize the process on the basis of the analytical data, for example by automatically varying the desired values in such a particular manner in the controlling devices that process disturbances which would affect the product quality are overruled. Accordingly, such an action still had to be executed manually by the operating personnel, thereby introducing human error into the operating and control procedure.

In order to eliminate the uncertain and often unreliable human factor from the continuous or batch-type chemical process control and particularly in determining the quality or the cost of the final product, digital process computer systems are used to control and operate chemical processes.

In order to be able to cover the entire tasks of computerized process control (controlling the process, doing optimization activities and getting a process computer system of high availability) two computers were sometimes connected in series U.S. Pat. No. 3,337,623 of Apr. 9, 1968), one computer being employed to control the process by direct digital control (DDC-computer) and the other computer being utilized for keeping the process operation at its optimum conditions as well as for data processing (Supervisory Computer). This last computer must be provided with a mass storage device, for example a disk file, to handle the large data flow.

In case the DDC-computer fails to operate, which can occur approximately every 2,000 to 3,000 hours, the supervisory computer must abandon to a large part its previous functions and take over control of the chemical process, thereby functioning as a replacement of the DDC-computer and so "-providing an emergency mode of operation" (U.S. Pat. No. 3,377,623, Col. 1, lines 44–45).

If the supervisory computer becomes inoperative, the chemical plant continues to be controlled by the DDC-computer. However the operations of maintaining the process at its optimal conditions and the data processing, normally provided by the supervisory computer, becomes interrupted. Thus in the conventional two-computer system, when one of the two computers becomes inoperative, the process control is reduced to an emergency mode of operation. This is a substantial advantage as compared to the one-computer system. However the optimization of the process and the data handling and processing, insofar as they are not part of the control procedure, become inoperative for the entire chemical plant or sections thereof.

Although the above-described two-computer system of the prior art accomplishes that a continuation of the conductance of the processes is assured to take place in the plant from a purely technical control viewpoint, when one computer fails the actual advantages of computerized chemical plants are lost.

SUMMARY OF THE INVENTION

An object of the present invention is to avoid the prior art disadvantages in the automatic control of chemical processes using computers.

Another object of the present invention is to provide an improved method for controlling and regulating chemical processes in a chemical plant using digital process computers wherein at least two identical computers are utilized to provide a continuous operation of the chemical process without interruption or loss of part of the computer control activities when one of the computers becomes inoperative.

A further object of the present invention is to provide an improved method for the automatic control and regulation of chemical processes with the aid of at least two digital process computers wherein, in the event that one computer becomes inoperative, the operations of maintaining the process at its optimum conditions as well as the total processing are not discontinued.

A further object of the present invention is to provide a method for the automatic control and regulation of chemical processes with the aid of at least two digital process computers, according to which each computer has stored in its storage means the same control program for the chemical plant, the control program consisting of program phases which have their equivalent in operational phases of the chemical process, wherein the chemical process is subdivided into working steps, a number of consecutive working steps is grouped together into operational phases, the most important working steps are located at the beginning of each operational phase and each operational phase can be repeated from the beginning of the phase without endangering the chemical process, whereby the sum of the program phases form the control program.

A further object of the present invention is to provide a method for the automatic control and regulation of chemical processes with the aid of at least two digital process computers wherein each computer has stored the same control program in its storage means and this control program is subdivided into program phases, both computers load one program phase from their mass storage means into their core storage and the computer (control computer) which actively controls the chemical plant starts to process this program phase while the other computer (backup computer) only follows the activity of the control computer and is updated by the control computer. If the control computer has finished processing a given program phase, then both computers store this phase back into their mass storage means and load the next consecutive program phase into their core storage and the control computer starts to process this next consecutive phase.

A further object of the present invention is to provide a method for the automatic control and regulation of chemical processes with the aid of at least two digital process computers wherein each computer has stored the same control program in its storage means and this control program is subdivided into program phases, one computer actively controls the chemical plant and the other computer is continuously updated by the control computer and in case of a failure of the control computer, the backup computer automatically takes over the control of the process by starting at the beginning of the program phase which had been processed by the failing computer.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages of computers connected in series (state of the art) may be eliminated and a much improved method for automatically controlling chemical processes may be obtained by operating in parallel at least two identical computers, respectively equipped with one core storage means (principal memory means) and one mass storage means (secondary memory means), and connecting these computers with the chemical process plant by way of a data flow bus. According to the present invention, one computer, that is the control computer, actively controls, regulates and optimizes the process whereas the other computer which serves as backup computer constantly follows the progress of the process by having the process data transmitted to it by the control computer. Thus, the backup computer is not an idle redundant computer (U.S. Pat. No. 3,377,623, Co. 1, line 28). If there is a breakdown in the control computer, the backup computer continues the process in its entirety and without any disturbance thereof.

Contrary to the state of the art, in the method and system of the present invention, for the automatic control and regulation, particularly of discontinuous chemical processes, two completely identical computers are connected in parallel. Both computers, in addition to their working storage means have a mass storage means so that each computer is capable of simultaneously providing the optimization and DDC functions heretofore described.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
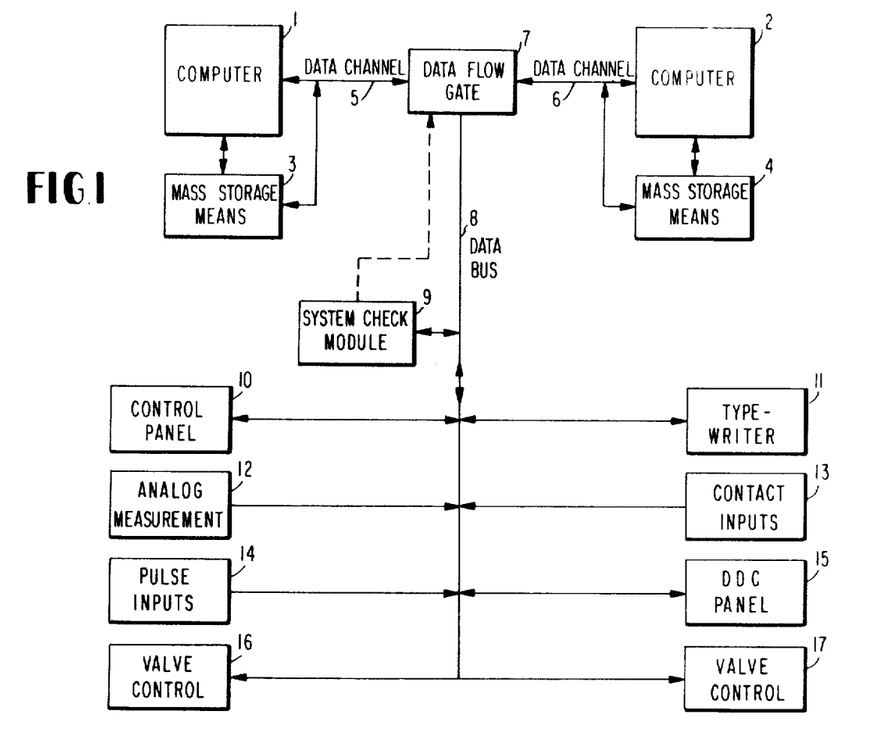
FIG. 1 illustrates in the form of a block circuit diagram the arrangement of the computers with respect to each other and with respect to the chemical plant and to the control station.

Referring now to the drawings the system of the present invention as seen in FIG. 1 comprises process computers 1 and 2 which operate in parallel. Each computer is connected with its bulk storage means, for example a drum or disk storage means by way of appropriate connecting lines, also called data channels. Thus, computer 1 is connected with its mass storage means 3 and computer 2 is connected with its mass storage means 4. Additional data channels 5 and 6 of the two computers meet in the data flow gate 7 where the data bus 8 leading to the chemical plant and to the control room likewise terminates. In the data flow gate, the switching step is conducted to determine along which path the information and commands, that is the data, are to travel. The data flowgate controls the direction into which data and control commands, i.e., opening or closing a valve, etc., have to travel. All components shown in FIG. 1 are well known to those skilled in the art and are commercially available on the market.

The chemical plant and the control room are connected to the data bus 8. This data bus is divided into several branches, for example branches 10 to 17. Branch 10 leads to the control panel in the control room, and branch 11 leads to the typewriter also located in the control room. Branches 12 to 14 are inputs for analog measurement signals (temperature, flows, pressures, etc.), contact inputs of valve positions and pulse inputs of the volume counters (positive displacement meters, turbine meters, etc.). Branch 15 leads to the panel for the direct digital control and branches 16 and 17 are outputs for the valve control wherein branch 16 carries only "open-close" commands, whereas branch 17 has analog outputs, to operate the continuous valves for the temperature control of the respective reactors (see FIG. 2, reference numerals 41 and 43). The arrows, indicated at all data channels including the individual branches which are also data channels, show in which direction the information and/or commands are traveling.

The control programs in the storage means of the computers enforce that only one computer, for example computer 1, dominates as the control computer and conducts the entire control, regulation and optimization of the chemical process and also finally stores the important data in the storage means. The other computer, which functions as the backup computer, merely follows the process by receiving from the control computer the necessary information via data channel 5, data flow gate 7 and data channel 6 and likewise stores, in turn, the important information in its storage means.

The control computer, for example computer 1, controls the data flow gate 7 in such a manner that the commands are transmitted from the computer to the chemical plant or the information is sent to the control room by way of data channel 5 and data bus 8 connected by the data flow gate 7. Over the same data channels the chemical plant or the panels in the control room send their signals or information to the control computer. The two computers are also connected with each other, as described above, by way of data channels 5 and 6, for the purpose of transmitting information to the backup computer.

In the normal situation, when computer 1 is fully operative as the control computer, the data flow gate does not establish a direct connection from the chemical plant and the control room to the backup computer 2. The ability of the control computer to operate properly is checked again and again in fractions of seconds by the system check module 9 located at the data bus 8. If a disturbance occurs in the control computer, for example computer l, then the system check module 9 connects the data bus 8 with the data channel 6 in the data flow gate 7 so that the backup computer, that is computer 2 now becomes fully active as the controlling computer, that is, it takes over not only the regulation of the entire chemical plant, but also the tasks of optimizing and storing important data.

This transfer of the total functions of computer 1 to computer 2 is made possible by the fact that both computers have available, in each of their mass storage means, a complete set of the operating and control programs, and both operating (core) storage means of the two computers contain the same operating program portions, called program phases which do reflect the actual control status of the plant or sections thereof, from the mass storage means, and have also received the measuring signals necessary for the control operation. In other words, the backup computer, that is computer 2, follows via the data channels 5 and 6, the progress of the chemical process on the basis of the continuous transmission of information from the control computer, or, expressed more clearly, the backup computer follows the processes taking place in the various reactors and thus has a complete picture of all procedures taking place in the chemical plant at all times even when it is not controlling the plant.

Figure 2:
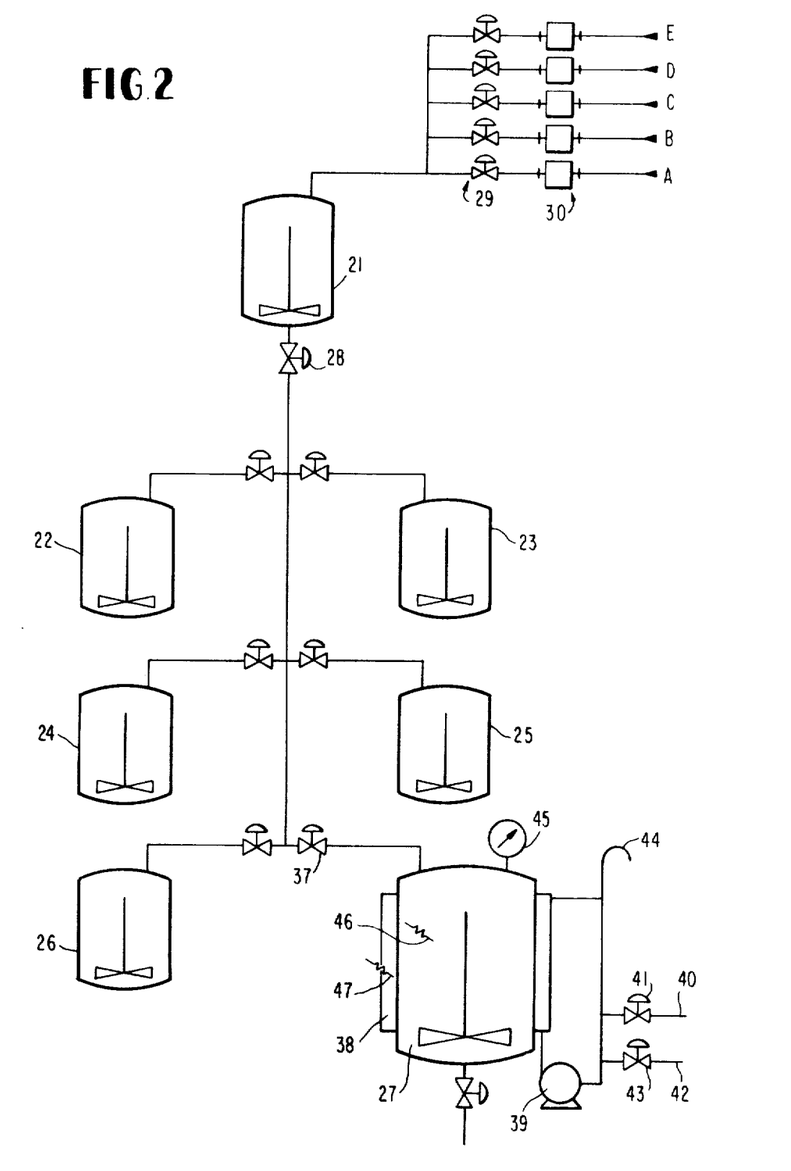
FIG. 2 is a schematic view of a number of elements of a batch type chemical plant including a metering unit, a feed tank or storage tank for the initial batch, and several reaction vessels which are operated independently of each other.

Such a computer system with the hardware and software interconnected is complicated, but provides an extremely safe operation. The use of such a system is advisable in the case of large chemical plants wherein the failure of process control and regulation leads to severe disturbances in operation. In the present example, the chemical plant consists of ten plant units of respectively eight reactors. FIG. 2 shows such a plant unit for the discontinuous polymerization for the purpose of producing polyvinyl chloride.

From materials A to E, a polymerization batch is prepared in the feed tank 21. The batch is then fed into one of the six polymerization reactors 22 to 27 illustrated herein and is polymerized at a reaction temperature of about 40° to 80° C. and a reaction pressure of about 6 to 12 atmospheres absolute within a reaction time of about 8 to 34 hours. Broadly, the computer arranges in sequence the polymerization batch as follows. If the feed tank 21 is empty and its outlet valve 28 is closed, the computer, in accordance with the required type of product and as guided by the recipe stored in its mass storage means meters the liquid materials A to E into the feed tank 21 by opening individual valves $29_A$ to $29_E$. The inflowing quantities are metered by the corresponding volume meters $30_A$ to $30_E$ transmitting the counting pulses to the computer, and the respective valves $29_A$ to $29_E$ are again closed by the computer after a predetermined amount of material as given by the stored recipe is introduced into feed tank 21. The batch is then homogenized by agitation in the feed tank.

Since the computer controls the process, working step by working step (opening or closing a valve, starting or stopping an agitator, etc., are typical working steps) for this entire reactor unit, it knows which of the polymerization reactors 22 to 27 is empty, has been flushed, has met the pressure requirements and is now ready to receive the next batch. Assuming that polymerization reactor 27 is ready to receive the next batch, the computer opens valves 28 and 37 so that the batch can flow into reactor 27. The computer interrogates the incoming signals to determine when the feed tank 21 is empty and, if so, the computer closes valves 28 and 37 and the next step, the polymerization, is started under the temperature conditions given by the recipe and, this action is carried out in an area of the operating storage means of the control computer assigned to this reactor. The backup computer follows the process procedure in each detail and is ready to take over, at any time, the control of the process, not only with respect to a single reactor, but with respect to the entire chemical plant.

The polymerizing process is now conducted in the polymerization reactor 27 with the conditions predetermined by the required type of product, and independent of the processes in the other polymerization reactors of the same plant unit or also of other plant units. The working storage means of computers are subdivided into areas for core resident higher priority programs similar to the priority structure, servicing programs for input and output devices of the computer system, etc., and core transient areas depending upon the number of reactors. Each reactor of a unit has assigned to it a specific zone in the transient area of the working storage means of both computers. Thus the present invention provides for a chemical plant comprising several parallel-operated plant units, each with several reactors which operate independently of one another wherein the working storage means of each computer are subdivided into transient operating zones or areas corresponding to the number of reactors and units and into resident zones containing the respective predominant programs, each transient operating zone controlling and regulating the progression of the process in the reactor or part of the plant assigned thereto, independent of the other storage zones.

Figure 3:
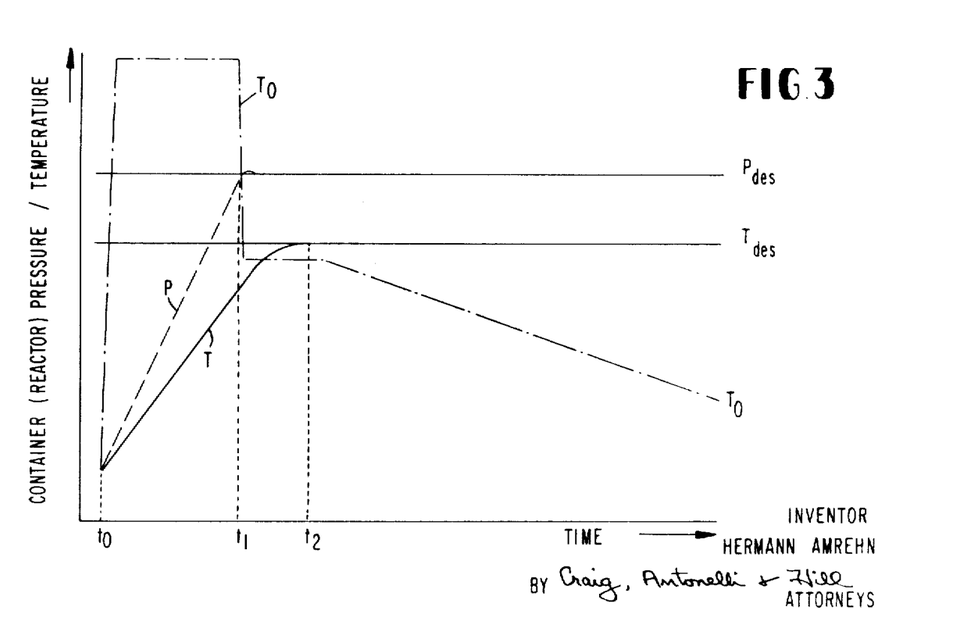
FIG. 3 illustrates the temperature curve for polymerization in a reaction vessel. This figure demonstrates how the computer masters the rather complicated control and regulation procedure.

With the transient programs in the zone of its working storage means assigned to the polymerization reactor 27, the control computer arranges in sequence the polymerization phase in this reactor 27 and among other things also controls the reactions temperature therein. The exact control of the predetermined polymerization temperature, without exceeding said temperature, exerts a substantial influence upon the quality of the final product. Consequently, a control scheme described hereinafter for this exothermic polymerization process has been developed which can be conducted only by means of a digital computer. It can hardly be carried out by use of conventional regulators. Whereas FIG. 2 schematically illustrates the necessary embodiment for a controlled polymerization in a polymerization vessel 27 in a detailed manner, FIG. 3 shows the temperature control program in its three working steps.

The polymerization reactor 27 is equipped with a heating-cooling jacket 38. The heating-cooling medium is circulated by pump 39 so rapidly that no large temperature gradient is created between the inlet and outlet pipes. The heating-cooling jacket can be supplied with a heating medium via conduit 40 containing a continuously adjustable valve 41 and with a cooling medium via conduit 42 also containing a continuously adjustable valve 43. The heating and/or cooling medium is withdrawn by way of an overflow means diagrammatically illustrated by 44. In order to conduct the temperature program, a pressure measuring device 45 is connected to the polymerization reactor 27 as well as a temperature probe 46, which extends into the reactor for measuring the temperature of the batch. Furthermore, the heat-cooling jacket temperature is measured by means of a temperature sensing element 47. The stirrer, the outlet line with its associated valve means, the feed line for nitrogen, stop liquid, etc., are not designated or shown in detail in FIG. 2.

After the charge has entered the container 27 and the valve 37 has been closed, at the instant $t_0$, the computer fully opens the heating medium valve 41 using appropriate servomotors, in order to bring the continuously agitated batch to the polymerization temperature as rapidly as possible. This temperature is designated in FIG. 3 as $T_{des}$, that is, the desired temperature. The temperature of the reactor jacket, $T_0$, shown in dot-dash lines in FIG. 3, rapidly assumes the temperature of the heating medium. The batch temperature T, measured with the probe 46 and shown by the full line in FIG. 3 gradually increases. However, the pressure P, shown by the dashed lines in FIG. 3, increases more rapidly. Since all materials are present in the liquid phase, the pressure P corresponds to the vapor pressure of vinyl chloride of the hottest partial volumes of the batch which are located at the heated walls of the reactor. Once the pressure has reached the value $P_{des}$, that is the desired pressure, which is the vapor pressure corresponding to the polymerization temperature $T_{des}$ at the instant $t_1$, the computer closes the heating medium valve 41 to such an extent and opens the cooling medium valve 43 to such a degree that a constant temperature $T_0$ is produced in the reactor jacket 38. This temperature is below the polymerization temperature $T_{des}$ by a preselected amount, for example about 7° C., because the exothermic polymerization reaction has now started, and it is undesirable for the final properties of the product if a part or the entire batch is overheated, as would be the case, for example, if the batch temperature were to go beyond the desired polymerization temperature $T_{des}$.

While the temperature $T_0$ of the reactor jacket 38 is kept at ($T_{des}$–7 C.) the reaction temperature T is slowly increasing and will finally reach the polymerization temperature $T_{des}$ at the instant $t_2$, the third portion of the temperature regulating program commences wherein the computer using its DDC capability by further closing the heating medium valve 41 and further opening the cooling medium valve 43 now maintains the batch temperature T at the value $T_{des}$ in the manner of a cascade control mode. In order to remove the heat of polymerization, the temperature $T_0$ of the reactor jacket 38 is lowered as indicated by the curve shown in the dot-dash line.

During the polymerization process, the computer stores the data required for the product quality and for the checking thereof in the mass storage means, in order to print a data sheet, by means of a typewriter, either in a predetermined chronological sequence, for example every 24 hours, or upon request. Also, each batch is assigned a batch number. The actual quantities of the batch materials used are registered and an indication is made as to which polymerization reactor was used to polymerize the batch. The start and later on the termination of the polymerization reaction is recorded in actual clock time, that is the actual time of day and all irregularities during polymerization are stored for the Log so that later on irregularities during the production cycle can be determined if the product does not meet its specifications.

The entire chemical process in the above-described example, that is the entire batch preparation and polymerization process is broken down into individual working steps. Such working steps are for example opening a valve, closing a valve, starting a pump, stopping a pump, comparing a pressure with a present value, starting timers, enabling or disabling DDC control actions, enabling or disabling special safety routines, outputting alarm messages etc. Finally the chemical process is the sum of all these working steps which may count up to several hundred.

Several working steps of the chemical process are, in turn, combined into larger units, so called operational phases, and the total sum of all of the phases constitutes the chemical process.

For combining the work in steps into operational phases the following rule has to be satisfied: the most important working steps of a phase have to be located at the beginning of the phase and each individual phase must be repeatable from any point thereof, from the beginning without endangering the process itself.

The working steps are then coded into computer language thus giving program steps. The working steps which form an operational phase of the process become, when coded, operational program phases and the sum of all program phases form the operating and control program for the computer system. These program phases fulfill the above-mentioned important rule because they are coded operational phases of the process only. The operation and control program is stored in the mass storage means of the computer. The computer will transfer by means of an appropriate read instruction a program phase from its mass storage means into the working storage means, process this phase, by means of an appropriate write instruction, return to it the mass storage means and take the next successive phase from the mass storage means and transfers the same into the working storage means in order to process this phase.

As set forth above, two identical computers are connected in parallel in the method of the present invention, one computer as the control computer, actively controlling and regulating the chemical plant, and the other computer following the progression of the process, for which purpose it receives important information concerning the chemical plant and its process from the control computer and stores the same, in turn, just as is done by the control computer at locations provided therefor either in the working storage means or the mass storage means.

Both computers will have in their transient core storage area the same program phase which corresponds to the actual plant operating condition. The control computer is processing the phase and thus actively controls the chemical process while the backup computer having the same program phase in its transient core storage area only follows the progress of the process and is updated by information transmitted by the control computer. Once the control computer has finished processing a program phase, for example the flushing of a reactor, it transmits this information to the backup computer. The backup computer, by using an appropriate computer control instruction, now transfers this phase just newly processed by the control computer from its transient working storage area back to its mass storage means and by using another appropriate computer control instruction transfers the next program phase for this reactor into the transient working storage zone. Once this is accomplished, the backup computer signals this fact to the control computer which now, in turn, transfers the processed phase into its mass storage means and takes the next phase into its transient working storage zone and proceeds immediately with the processing of this next phase. The backup computer remains at the beginning of the phase and does not become operative unless chronological actions are to be initiated or information is to be stored. Once the control computer has processed this phase, only the backup computer, upon an appropriate signal as described above, first loads the next following phase to its transient working storage zone, transmits a corresponding signal to the control computer, and thereafter the control computer transfers the contents of this phase from its transient working storage means and takes up the new phase and commences processing said new phase.

If now the control computer fails during the processing of a phase, at any operating step, the system check module 9 switches the data flow gate 7 so, that now the backup computer actively controls the entire chemical plant and regulates it. In this situation the computer starts in each case, that is for every single reactor and for all other parts of the plant which is taken over at the beginning of the respective phase. Thus, errors are avoided, or wrong commands are annulled which might have been emitted by the defective computer immediately before it was taken out of operation. Only in rare cases can the phase being processed shortly before failure of the computer not be repeated. This is when the threshold of the phase is just reached, and the command for loading the new phase of the corresponding working storage zone is already transmitted and executed by the backup computer.

When dividing the chemical process into the individual phases according to the present invention, consideration must be given to the fact that these phases must be repeatable starting at each operating step, and at the tend of a phase, a relatively unimportant command is to be present, so that when the active computer fails during phase change, and this last command of the preceding phase is altered by this failure, or obliterated, the respective portion of the process is not interfered with or misdirected.

To achieve the concept of being repeatable, the correct subdivision of the phases deducted from the operational phases of the process is important. For example, the operating program and control program before a reactor is filled with a new batch of reactants is roughly set forth in the flow diagram of FIG. 4.

Figure 4:
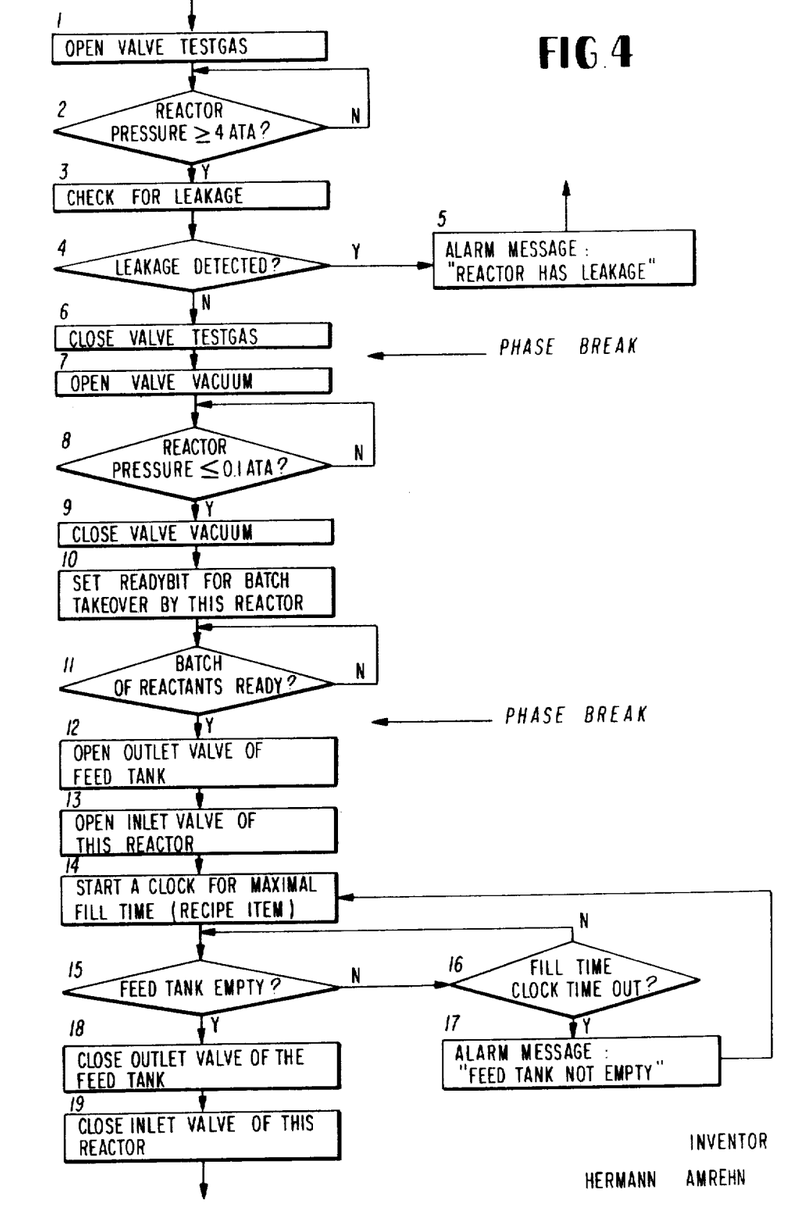
FIG. 4 is a block diagram providing an illustration of the breakdown of a section of a chemical process and its operational steps in respect of its phase alignment.

In this flow diagram only the important working steps are noted, all test steps like testing if a valve has opened or closed, if a pressure reading is correct, etc., are not incorporated. The polymerization reactor is checked for leakage by filling the reactor with a test gas above a preselected pressure (blocks 1–6). If the reactor does not show a leak, the test gas is removed by opening a vacuum valve and connecting thus the reactor to a vacuum device until the reactor pressure becomes equal or less than a preselected pressure, then the vacuum valve is closed again (blocks 7–9). The reactor is now ready to take over a batch of reactants (block 10). When a batch of reactants in the feed tank is ready (block 11), the outlet valve of the feed tank is opened (block 12) and the inlet valve into the reactor is opened also (block 13). Now the batch flows into the reactor. To check this fill time, a clock which is preset to the maximum fill time is started, this time is taken from the recipe because it can take 10 minutes to 3 hours, depending on the type of material being processed. A level measuring device of the feed tank is now checked continuously (block 15). If, within the maximum fill time the feed tank becomes empty, the outlet valve of the feed tank and the inlet valve of reactor are closed (blocks 18 and 19). In this flow diagram the correct phases are noted also. One phase starts with block 1 and ends with block 6, the next phase starts with block 7 and ends with block 11. Let it be assumed that the phase break between blocks 6 and 7 does not exist and the control computer would fail while waiting in block 8 for the desired pressure, the backup computer would take over control of the process and start the phase at the beginning, that is block 1, by opening the test gas valve. Hence, test gas would flow into the reactor and would again leave the reactor by way of the still open vacuum valve. Consequently, the connection of block 2, i.e., pressure ≥4 ATA will never be fulfilled and the computer will never be able to continue to process this reactor. Let it be now assumed that the phase break between blocks 11 and 12 is missing only. If now the control computer fails somewhere in blocks 14 to 17, the backup computer would start at the beginning of the phase, that is at block 7 by opening the vacuum valve. This polymerization reactor would then be inoperative for a long period time, for it takes quite a while until the entire amount of vinylchloride of the batch already in the reactor is evaporated and conveyed out of the reactor by way of the vacuum pump. This does not consider the fact that the valuable batch is lost and the gases emitted by the vacuum pump create a danger.

However, if the phase limits, as mentioned above, are placed correctly, nothing would change in the progression of the process due to the fact that the backup computer takes over and the phase thus starts anew. In the first example, the backup computer would reopen the vacuum valve, which is still open, then wait until the desired pressure is reached and then continue to process the reactor. In the second example, the backup computer would reopen the outlet valve of the feed tank and the inlet valve of the reactor, both are still open, restore the clock and wait until the feed tank is empty and then continue processing the reactor.

After the failure of a computer, which is expected approximately every 2,000 to 3,000 operating hours, that is about four times a year, it is repaired and reconnected to the process. By interrogating the active computer the newly connected computer transfers into all zones of its working storage (core storage) means the phase just being processed in the respective reactor. Furthermore, it has transmitted to it all of the important information which is at that time stored in the active computer, and in turn, stores this information, depending upon its significance, in the respective locations in its working (core) and/or mass storage means. Once it possesses a complete picture of the processes and the other procedures taking place in the chemical plant which are controlled by the active computer, then and only then is the distinction made as to whether the control computer or the backup computer have been restarted.

When the control computer has been restarted, it asserts its predominance, which was programmed into this computer, changes the data flow gate over, and takes over itself the active control and regulation of the chemical plant. The backup computer is thus again switched to its backup state from which state it follows the progression of the process as described above.

When the backup computer is the one which is again connected to the process, it reverts to its backup state after obtaining a complete picture of the processes in the chemical plant, and follows the procedures taking place in the plant and is ready at any time to take over the complete active control of the entire plant, including all optimization calculations and readout process, that is, including those functions which cannot be provided in the conventional two-computer systems when one computer becomes inoperative, because the one computer remaining functional can only exercise DDC functions. Thus a substantially safer and always optimum operating computer system can be provided at a relatively low additional expenditure for the computers and for the programming work.

The invention being thus described, it will be obvious that the same may be varied in many ways. Such variations are not to be regarded as a departure from the spirit and scope of the invention, and all such modifications are intended to be included within the scope of the following claims.

I claim:

1. A method for the automatic control and regulation of chemical processes consisting of a number of operating steps by the use of digital data processing equipment, comprising the steps of organizing the process into a plurality of operating phases each including several steps with the first step of a phase being relatively more important than the last step thereof, each phase being repeatable without endangering the process;

operating two substantially identical computers in parallel in accordance with the programmed process with one computer, which forms the control computer, normally actively controlling and regulating the process whereas the other computer, forming a backup computer, follows the progression of the chemical process by the transmission of data including program phase changes from the control computer;

continuously monitoring the control computer for its correct operation, and continuing the chemical process without interruption and loss of control effectiveness in case of failure of the control computer by repeating with the backup computer the last program phase controlled by the control computer and thereafter continuing the programmed process by the backup computer.

2. The method according to claim 1, in which the control computer selectively controls a data flow gate in such a manner that the commands and information are transmitted from the control computer to the chemical plant or to a control room by way of data channels connected by the data flow gate, and in which revertive signals measuring data and other information travel to and from the chemical plant and the control room to the control computer.

3. The method of claim 2, wherein when the control computer is fully operational, the data flow gate does not establish a direct connection from the chemical plant and the control room to the backup computer.

4. The method of claim 1, wherein when a disturbance occurs in the control computer, a system check module carrying out the monitoring function communicates with the backup computer through data channels connected to each other in the data flow gate such that the backup computer now becomes fully active as the operating computer and takes over the regulations and controls the entire chemical plant and the tasks of optimizing and storing data.

5. The method of claim 1, wherein the backup computer via data channels follows the progress of the chemical process by the continuous transmission of information from the control computer.

6. The method of claim 1, wherein the computers store the important processing data in their mass storage means and print the data with printing devices in predetermined chronological intervals or upon request.

7. The method of claim 1, wherein the progression of the chemical process is subdivided into individual phases where the total sum of the phases is called the operating program which is stored in the mass storage device.

8. The method of claim 7, wherein the control computer transfers by means of an appropriate readout interrogative command a phase from the mass storage means into the working storage means, processes this phase, returns it to the mass storage means, takes up the next phase from the mass storage means and transfers the same into the working storage means in order to process this phase.

9. The method of claim 7, wherein after the control computer has finished processing a phase in an operating step, it transmits this information to the backup computer which in turn transfers this phase, just newly processed by the control computer, from its working storage zone back to its mass storage means and transfers the next phase into the working storage zone and when this is accomplished the backup computer signals this fact to the control computer which transfers the processed phase into its mass storage means and takes over the next phase into its working storage zone and proceeds immediately with processing this next phase.

10. The process of claim 7, wherein the phase can be repeated from any of its operating steps, the last operating step of the phase being of minor importance.

11. The method of claim 7, wherein when the control computer fails during the processing of the phase at any operating step, a system check module switches the data flow gate over so that now the backup computer actively controls and regulates the entire chemical plant, said backup computer commencing at the beginning of the respective phases.

12. The method of claim 1, wherein the working program for the computers is subdivided into program phases in correspondence with the phases of the chemical process, and when the control computer becomes inoperative and its active function is transferred to the backup computer, the respective phase being processed at that time is again processed starting with the beginning of the phase.

13. The method of claim 1, wherein after a repaired computer which had failed is reconnected to the system, it interrogates the active computer transferring the information of the phase just being processed in the active computer into all zones of the working storage means of said repaired computer, and has transmitted to it all important information which are stored in the active computer and, in turn, stores this information which are stored in the active computer, and in turn, stores this information in respective locations in its working as well as mass storage means, thereby giving the repaired computer a complete picture of the processes and other procedures taking place in the chemical plant.

14. The method of claim 13, wherein when the repaired computer is the control computer, it takes over the active control of the process and switches the backup computer back into its backup state.

15. The method of claim 13, wherein where the repaired computer is the backup computer, it reverts to its backup state after obtaining a complete picture of the processes in the chemical plant, and then follows the progression of the processes in the backup state.

16. A system for the automatic control and regulation of chemical processes in a chemical plant using digital process computers which comprises at least two identical computers connected in parallel to each other each computer being equipped with a mass storage means and an operating storage means, and means operatively connecting said computers to each other and to a chemical process plant by means of a data flow gate means in such a manner that the control computer, actively controls and regulates normally the entire chemical process where as the other computer, designated the backup computer, normally merely follows the progression of the chemical process by a transmittal of the data by data channels from the control computer to the backup computer, and continues the chemical process without interruption or loss of control effectiveness when the control computer becomes inoperative, by taking over the entire control and regulation from said one computer, restarting the same from a predetermined point in the process.

17. The system of claim 16, wherein data channels connect the computers with their mass storage means and connect both computers and mass storage means with the data flow means.

18. The system of claim 17, wherein data channels connect the data flow gate means with a control room, with a chemical process plant, and the control room with the chemical process plant.

19. The system of claim 18, wherein the data channel connected to the chemical process plant is subdivided into a branch leading to an indicator and operating panel in the control room, a branch leading to the readout printing unit, more than one branch providing inputs for analog measuring values, for revertive signals regarding valve positions and for measuring the pulses of volume meters, a branch providing input and output for direct digital control, and additional branches providing outputs for valve control.

20. The system of claim 16, wherein both computers contain in their mass storage means the complete operating program and both operating storage means of the two computers contain in their partial sections the same operating program portions from the mass storage means and have also received the measuring values necessary for a control operation.

21. The system of claim 16, comprising a chemical plant comprising several parallel-operated plant units, each with several reactors which operate independently of one another wherein the working storage means of each computer are subdivided into operating zones corresponding to the number of reactors and into zones corresponding to the respective predominant stages, each operating zone controlling and regulating the progression of the process in the reactor or part of the plant assigned thereto, independent of the other storage zones.

22. A method for controlling the temperature of an exothermic reaction in the liquid phase with a high starting temperature according to claim 1, wherein the control computer commences the reaction by supplying heating medium for heating the reactor until the vapor pressure of the reactants correspond to the desired reaction temperature, at which time the supply of the heating medium is throttled and the control computer partially supplies a cooling medium to the reactor and after the desired reaction temperature has been reached in the interior of the reactor, the control computer maintains this temperature constant in the manner of a cascade regulator by further throttling the supply of the heating medium and correspondingly increasing the supply of the cooling medium.

23. A method for the automatic control and regulation of chemical processes in a chemical plant by the use of digital data processing equipment including digital process computers, each equipped with a mass storage means and with an operating storage means, said computers being connected in parallel with each other and with a chemical plant by means of a data flow gate, each computer having the same operating and control program for the chemical plant stored in its storage means which corresponds to the chemical process divided into program phases, wherein the chemical process is itself divided into working steps, a number of working steps are combined into operating phases, and a relatively more important working step is located at the beginning of an operational phase and each operational phase is capable of repetition from its beginning without endangering the chemical process, the total sum of the operational phases constituting the chemical process, and wherein each working step and operational phase of the chemical process is coded into computer language so that for each working step of the actual process a program step is generated and each operational phase of the process has its equivalent program phase and all program phases constitute the operational and control program of the chemical process which is stored into the storage means of both computers, comprising the steps of operating two substantially identical computers in parallel with one computer constituting the control computer normally actively controlling and regulating the process whereas the the other computer, forming a backup computer, follows the progression of the chemical process by the transmission of data including program phase changes from the control computer, continuously monitoring the control computer for its correct operation, and continuing the chemical process without interruption and loss of control effectiveness in case of failure of the control computer by repeating with the backup computer the last program phase controlled by the control computer by starting to repeat said phase from the beginning thereof.

24. A system for the automatic control and regulation of chemical process plants, comprising two computers each having its own storage means having the same operating and control program for the chemical plant stored in the storage means thereof, said program being divided into a plurality of program phases each including several working steps with a relatively more important working step located at the beginning of an operational phase and each operational phase being capable of repetition from its beginning without endangering the chemical process, and connecting means interconnecting said two computers in parallel with each other and with a plant in such a manner that the plant is normally controlled by one of said computers with the other computer constituting a backup computer including means for normally transmitting information from said one computer to the other computer as regards progress of the chemical process so that the other computer follows said one computer phase by phase, a system check means for continuously checking the system for proper operation of said one computer, and means for switching control of the plant from said one computer to said other computer in case of improper operation of said one computer as determined by said system check means including means for starting the control by said other computer with the beginning the phase under progress by said one computer when the latter fails.

25. A system according to claim 24, wherein said storage means includes a mass storage device and a core storage device, and wherein said connecting means transmits from said one computer a signal to the other computer indicating the completion of a phase, whereupon said other computer returns the corresponding phase from its transient area of the core storage to its mass storage, takes the next phase from its mass storage to its transient area core storage, transmits a signal to the one computer of the completion of the phase change, whereafter said one computer proceeds to return the just completed phase from its core storage to the mass storage and transfers the next phase from its mass storage to its transient area core storage, and thereafter proceeds with the control and regulation according to the next phase.

* * * * *